United States Patent
Billow et al.

(10) Patent No.: US 9,914,309 B2
(45) Date of Patent: Mar. 13, 2018

(54) METHOD AND APPARATUS FOR SINGLE-PASS FAILED NOZZLE COMPENSATION

(71) Applicant: ELECTRONICS FOR IMAGING, INC., Fremont, CA (US)

(72) Inventors: Steven Billow, Bow, NH (US); Leon Williams, Walworth, NY (US); Ghilad Dziesietnik, Palo Alto, CA (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 14/304,824

(22) Filed: Jun. 13, 2014

(65) Prior Publication Data
US 2015/0360491 A1 Dec. 17, 2015

(51) Int. Cl.
*B41J 2/21* (2006.01)

(52) U.S. Cl.
CPC ........... *B41J 2/2139* (2013.01); *B41J 2/2142* (2013.01); *B41J 2/2146* (2013.01)

(58) Field of Classification Search
USPC ............................................. 347/9, 37, 43
See application file for complete search history.

(56) References Cited

U.S. PATENT DOCUMENTS

| | | | |
|---|---|---|---|
| 6,270,187 B1 * | 8/2001 | Murcia | B41J 2/0451 347/37 |
| 2002/0051144 A1 | 5/2002 | Ilbery et al. | |
| 2006/0139663 A1 | 6/2006 | Ilbery et al. | |
| 2010/0039471 A1 | 2/2010 | Walmsley et al. | |
| 2012/0062642 A1 | 3/2012 | Jimenez et al. | |

* cited by examiner

*Primary Examiner* — Lam Nguyen
(74) *Attorney, Agent, or Firm* — Perkins Coie LLP

(57) ABSTRACT

Compensation algorithms are applied to hide failed nozzles or, at least, reduce the objectionable effect of such nozzles in a printed image. Once a failed nozzle or under-performing nozzle is detected in a single-pass printing system, it is shut-off and the image data that was intended to be printed by this nozzle is redistributed to its neighboring nozzles. Embodiments of the invention use of a 1-D look-up table and stochastically distribute the duty cycle to each neighboring nozzle. In this way, failed nozzles are effectively hidden in the final print.

12 Claims, 10 Drawing Sheets

Redistribute duty to neighboring nozzles

Failed nozzle

METHOD AND APPARATUS FOR SINGLE-PASS FAILED NOZZLE COMPENSATION

TECHNICAL FIELD

The invention relates to print quality improvement and reliability gains. More particularly, the invention relates to print quality improvement and reliability gains that can be realized when implementing compensation algorithms for faulty-firing nozzles in a single pass printing operation.

BACKGROUND ART

A single missing or misdirected nozzle can result in unacceptable image quality in single-pass printing applications (see FIG. 2A). Without compensating for these poorly performing nozzles, waste and scrap is incurred.

Preventative and reactive maintenance can be used to compensate for poorly performing nozzles. For example, cleaning the print head can often recover failed nozzles. However, even with automated cleaning stations, this approach requires that the press be shut down for at least a short period of time. After the cleaning, the operator must check the nozzles to see if the cleaning was effective. Additionally, while preventative maintenance, e.g. performing periodic regular cleaning in the hope of avoiding a failed nozzle, can help it is not a foolproof system because nozzles can fail unpredictably from a variety of causes.

Redundant nozzles can be used to compensate for poorly performing nozzles. If nozzles are paired so that two or more nozzles print the same color on roughly the same raster column, the image duty is divided between these nozzles. If one of these nozzles fails, the impact on the print is significantly less than if a single nozzle was used to print that part of the image. However, this approach significantly increases the cost and complexity of the printer.

Color replacement can be used to compensate for poorly performing nozzles. In this approach, other colors are used to fill in for the missing nozzle, Thus, a mixture of cyan, magenta, and yellow could compensate for a missing black nozzle. However, this technique suffers when a colorimetric match requires the use of a color profile because the image must be re-ripped in real time. Likewise, there could be primary colors, e.g. yellow, that have no other color capable of filling in.

It would be advantageous to provide a technique that compensates for missing or misdirected nozzles that otherwise would result in unacceptable image quality in single-pass printing applications.

SUMMARY OF THE INVENTION

Embodiments of the invention apply compensation algorithms to hide failed nozzles or, at least, reduce the objectionable effect of such nozzles in a printed image. In this way, printed product can be salvaged, the need for replacement printer parts can be reduced, and press uptime can be increased.

Once a failed nozzle or under-performing nozzle is detected in a single-pass printing system, it is shut-off and the image data that was intended to be printed by this nozzle is redistributed to its neighboring nozzles. Embodiments of the invention use, for example, a 1-D look-up table to select the amount of desired compensation and stochastically distribute that compensation to each neighboring nozzle. In this way, failed nozzles are effectively hidden in the final print.

Embodiments of the invention herein disclosed apply all compensation within a given color plane, e.g. if cyan has a missing nozzle, the compensation makes modifications to the cyan image data and no other image plane is affected, e.g. a light cyan nozzle that substantially aligns with a missing cyan nozzle can be used to partially compensate for the missing cyan nozzle.

Thus, compensation for missing or misdirected nozzles is provided. With a properly designed writing system, e.g. sufficient resolution, adequate headroom in the tone scale, and a nozzle detection system, the herein disclosed technique is effective in hiding missing or poorly performing nozzles. In this way, the herein disclosed technique can ensure high uptime and press availability, while maintaining high quality printing.

DETAILED DESCRIPTION

General Approach

Once a failed nozzle or under-performing nozzle is detected in a single-pass printing system, it is substantially shut-off and the image data that was intended to be printed by this nozzle is redistributed to its neighboring nozzles. Embodiments of the invention use of a 1-D look-up table and stochastically distribute the duty cycle to each neighboring nozzle. In this way, failed nozzles are effectively hidden in the final print. Those skilled in the art will appreciate that, in embodiments of the invention, the look-up table can be a nD look-up table, i.e. table having more than one dimension.

Prerequisites

To operate effectively, embodiments of the invention require that three prerequisites be satisfied, i.e.:

1. The single pass print system must have a cross-web resolution sufficient for dot gain, i.e. fluid flow as well as optical, to fill in for the failed nozzle partially. In embodiments of the invention, cross-process resolutions over 600 dpi are sufficient. Lower resolutions can also benefit and could be appropriate for some applications.

2. Failed or underperforming nozzles must be detectable during operation. This can be accomplished in a variety of ways, such as by inspection of inserted test patterns between printed images, inspection of the printed articles themselves, drop detection systems incorporated into the printer hardware, etc.

3. To provide adequate compensation at the maximum desired density, the printer must be calibrated such that it has headroom above this highest density, i.e. the printer should be capable of printing at a slightly higher density than the maximum calibrated output density to facilitate compensation at that maximum density.

Failed Nozzle Detection

As described in greater detail below, embodiments of the invention require feedback regarding which nozzles require compensation. The feedback process can comprise any of manual input by an operator through a GUI or other suitable interface once the operator has manually identified the failed or poorly performing nozzle; or a machine vision system that analyzes a specially designed target, or intelligent analysis of a printed image, whereby a printed article is compared to a standard, and wherein that standard may be a previously printed copy of that article that was determined to be acceptable or the standard could be an electronic version of the article that is compared to the printed version. Embodiments of the invention can also comprise automatic bad-jet detection wherein the quality of drop ejection is assessed without printing onto the substrate, e.g. by on-board monitoring within the print head, a photo-emitter/detector in the maintenance cap, acoustic drop detection methods, electrostatic drop detection methods, etc. Such embodiments of the invention can integrate a bad-jet compensation scheme into a printer unobtrusively and without requiring analysis of a printed target or article.

Process Flow

Figure 1:
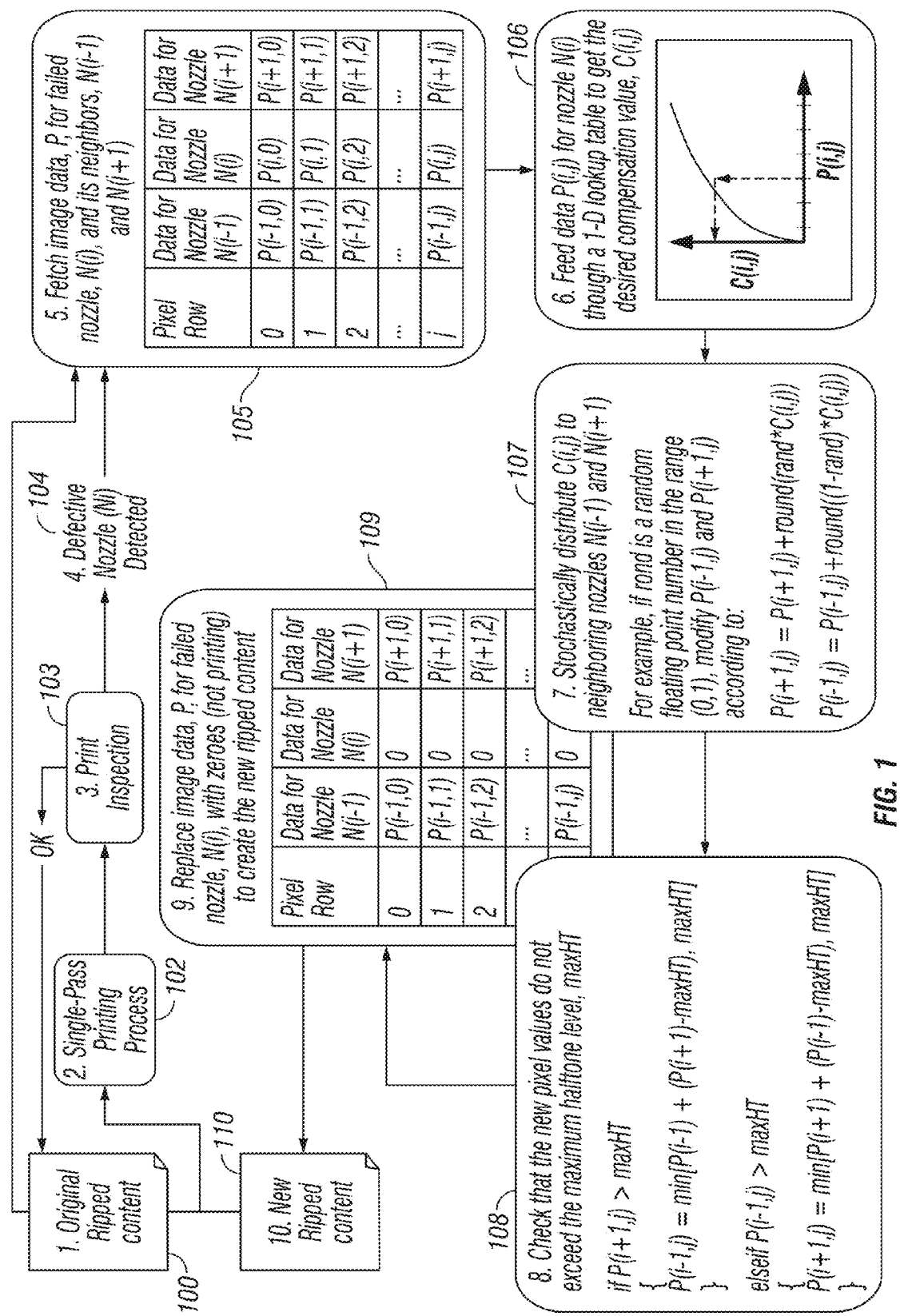
FIG. 1 is a block schematic diagram showing a process flow for missing or misdirected nozzle compensation according to the invention.

FIG. 1 is a block schematic diagram showing a process flow for missing or misdirected nozzle compensation according to the invention. The following discussion of FIG. 1 is tied to the steps shown in FIG. 1.

Step 1 (100). The original ripped image is provided without any compensation. In embodiments of the invention, the image is fully rendered and half toned to the appropriate number of levels for the target printing press. As will be described herein, this image is modified to effect the compensation needed to compensate for missing or misaligned nozzles. It's important that the original image, i.e. the image devoid of any compensation, be cached so that after print head maintenance and nozzle recovery the printer can return to its original printing state.

Step 2 (102). The ripped image is printed. In an alternate embodiment, this step can be skipped and the results from an earlier detection (Step 3) applied immediately to this image. For example, if a printing press is used to print essentially unique items (copy counts close to one), then the results from a single detection event (Step 3) are cached and applied to all subsequently printed articles until the next detection event.

Step 3 (103). A detection system assesses the print for any print defects that could be a result of a faulty nozzle. In embodiments of the invention, the detection system is a camera or scanner system that is placed downstream from the printing process. Commercially available systems are readily available on the market for this purpose. Such camera system analyzes the actual printed image to identify any defective nozzles. Preferably, a specialized target is printed periodically between the images to facilitate easier detection and diagnosis.

Step 4 (104). If no defect is detected, the original ripped image is reprinted and this continues until the copy count for the print job is fulfilled. If a faulty nozzle is detected, control passes to the nozzle compensation algorithm. In the case where the workflow consists of multiple jobs having small copy counts, each job is printed in its original ripped form until the next detection event.

Step 5 (105). The image data is fetched for the faulty nozzle $N(i)$, as well as for its neighbors $N(i-1)$ and $N(i+1)$. These data are the desired halftone print levels for these three nozzles from the original image (100). If index j indicates the raster row, the pixel data P for any given row j for these three nozzles is $P(i-1,j)$, $P(i,j)$, and $P(i+1,j)$. This scheme is shown in Table 1 below.

TABLE 1

| | Nozzle Mapping | | |
|---|---|---|---|
| Pixel Row | Data for Nozzle $N(i-1)$ | Data for Nozzle $N(i)$ | Data for Nozzle $N(i+1)$ |
| 0 | $P(i-1, 0)$ | $P(i, 0)$ | $P(i+1, 0)$ |
| 1 | $P(i-1, 2)$ | $P(i, 1)$ | $P(i+1, 1)$ |
| 2 | $P(i-1, 2)$ | $P(i, 2)$ | $P(i+1, 2)$ |
| – | – | – | – |
| j | $P(i-i, j)$ | $P(i, j)$ | $P(i+i, j)$ |

Step 6 (106). The data $P(i,j)$ is cascaded through a one-dimensional look up table (1-D LUT) that is figuratively represented by a curve. The 1-D LUT has a number of entries that is equal to the number of halftone levels. The value or output of each entry is the desired compensation halftone level $C(i,j)$. For example, if nozzle $N(i)$ is requested to print a halftone level of "5" at pixel row j, i.e. $P(i,j)=5$, then the 1-D LUT has a value of "7," meaning that seven additional halftone counts are requested from neighboring nozzles $N(i-1)$ and $N(i+1)$ to compensate for the absence of halftone level "5" from nozzle $N(i)$.

There are a few important points regarding this look-up table:

While the number of entries in the 1-D LUT is equal to the number of halftone levels in the original ripped image, the values in the 1-D LUT may exceed this level. This is preferred, although not necessarily required, because it permits the system to compensate for a failed nozzle, even when its neighbors are already asked to output maximum density. This extra capacity, referred to as headroom elsewhere in this document, makes the system more robust. It requires the printer to deliver slightly more ink than is normally required for its normal, color-managed, output. This peak output is called maxHT in the flow chart and is revisited in Step 8.

The values of 1-D LUT are determined empirically. Those skilled in the art will appreciate that the value in the 1-D LUT typically exceeds the original halftone level, i.e. it takes slightly more ink to compensate for a failed nozzle than is required if that nozzle is printing satisfactorily.

Development of the 1-D Compensation LUT

In embodiments of the invention, the 1-D look up table referenced in Step 6 is generated empirically. An overly simplistic method takes the ink intended to be printed by the failed nozzle and splits it between its two neighbors. This approach does not give the best image quality for all halftone levels. Rather, in embodiments of the invention it is preferred to print a matrix such at that shown in Table 2 below.

TABLE 2

Print Matrix

| Halftone Level | Compensation Level | | | | |
|---|---|---|---|---|---|
| | 50% | 75% | 100% | 150% | 200% |
| 1 | - | - | 0 | + | + |
| 2 | - | - | 0 | + | + |
| 3 | - | - | - | 0 | + |
| 4 | - | - | - | - | 0 |
| 5 | - | - | - | 0 | + |

At each halftone level, an image is created with a nozzle disabled. Then, varying amounts of compensation are applied to the neighboring nozzles. For example, if the first halftone level deposits 10 pL of ink, a compensation level of 100% uses the neighboring nozzles to print a total of 10 pL extra ink. Likewise, a compensation of 150% strives to print 15 pL extra ink with the neighboring nozzles.

The prints are evaluated to determine if any visible defect in the print remains after the compensation is applied. For example, Table 2 above is coded where "-" indicates a light streak is still present after the compensation, "+" indicates a dark streak is present after the compensation, and "0" indicates no streak is present after the compensation.

In embodiments of the invention, the best path through Table 2 is the 1-D LUT referenced in Step 6. For this example, one would choose the values shown in Table 3 below.

TABLE 3

Ink Compensation Values

| Input Halftone Level | Output Compensation Level |
|---|---|
| 1 | 1.0 |
| 2 | 1.0 |
| 3 | 1.5 |
| 4 | 2.0 |
| 5 | 1.5 |

One can see from this example that it is advantageous to have headroom in the tone scale curve, i.e. to be able to print more ink than an amount that is typically demanded in a print gives the ability to compensate for halftone levels 4 and 5 (Table 3), each requiring a halftone level of 7.5 or greater. In other embodiments of the invention, if a printer does not have this headroom, it is possible to slow down the print speed, which typically opens up such headroom. Alternatively, for systems lacking sufficient headroom, it is possible to practice this invention, deriving substantial benefits for most of the tone scale excluding areas of maximum density.

Additional compensation levels can be generated and printed as part of the matrix above if it is deemed necessary to do so, e.g. if the jump from 100% to 150% is so large that one sees a light streak at 100% and a dark streak at 150%. Intermediate levels, such as 125%, could also be tested that improve the granularity of the resulting compensation look-up table.

Step 7 (107). The compensation duty $C(i,j)$ is stochastically distributed to the two neighboring nozzles. For example, if rand is a random floating point number in the range (0,1), modify $P(i-1, j)$ and $P(i+1, j)$ according to:

$$P(i+1,j)=P(i+1,j)+\text{round }(\text{rand}*C(i,j)) \quad (1)$$

$$P(i-1,j)=P(i-1,j)+\text{round }(1-\text{rand})*C(i,j)) \quad (2)$$

There are several possible manifestations of this redistribution, e.g.:

Embodiments of the invention concern distributing the duty of the compensation to the nozzles directly neighboring the failed nozzle. This is not required and it may sometimes be advantageous (smoother) to redistribute the compensation duty to additional nozzles farther away from the failed nozzle in addition to its direct neighbors. This is particularly true for systems with high cross-process resolutions, e.g. >600 dpi.

The example in FIG. 1 shows a white noise i.e. completely random, distribution method. This has been shown experimentally to produce pleasing results, but there are many ways to perform the stochastic distribution. For example:

Blue noise can be used instead of white noise. This yields a slightly smoother looking edge at the cost of a moderate additional computation load. One technique for accomplishing this takes a 1-D blue noise filter as a threshold, as is typically done in blue noise dither half toning.

More sophisticated half toning techniques, such as error diffusion, can be used to distribute the compensation duty. Naturally higher computation costs must be balanced against the improvements in print quality. In the case of error diffusion, the compensation that is required at a pixel row that might be clipped or lost in the rounding process can be diffused or distributed to neighboring pixels by way of an error diffusion filter as is commonly done in halftoning operations for rendering of images for digital printing.

Step 8 (108). It is possible that after the compensation step (Step 7), the requested halftone level exceeds the peak output of the printer maxHT. This can be handled in step 7 if a more sophisticated redistribution approach is taken, e.g. error diffusion, but this approach has its costs. The computationally cheap method described in Step 8 is to take any of this over-saturation and try to hand it off to the other neighbor. If this results in oversaturation for that nozzle, then the compensation is either further distributed to neighbor farther away from the failed nozzle or the additional compensation over the saturation limit is discarded, as is shown in the manifestation demonstrated in FIG. 1.

Thus, the system determines if the new pixel values exceed the maximum halftone level maxHT. Thus:

```
if P(i +1, j) > maxHT
{
P(i-1, j) = min [P(i-1) + (P(i+1) -maxHT) , maxHT]
}
elseif P(i-1, j) > maxHT
{
P(i+1) = min [P(i+1) + (P(i-1) -maxHT), maxHT]
}
```

Step 9 (109). The data for the failed nozzle is zeroed out. A failed nozzle could spontaneously recover. If the data for this nozzle is not zeroed-out and the nozzle recovers, a localized excess of ink is printed and a dark streak results in the print. Furthermore, the detection algorithm may not be sophisticated enough to discern between a failed nozzle and a severely misdirected nozzle. By shutting off the detected faulty nozzle, the system is much more robust.

Step 10 (110). The modified image data columns are inserted back into the halftoned image. This modified image is then fed to the printer. If a special target for nozzle assessment is inserted between printed images, the failed nozzle is preferentially exercised to ascertain if it has recovered and/or to prevent more serious clogging.

Step 11 (not shown). After press or print head maintenance, the print quality of all nozzles can be fully characterized and all compensation values reset as appropriate.

Figure 2B:
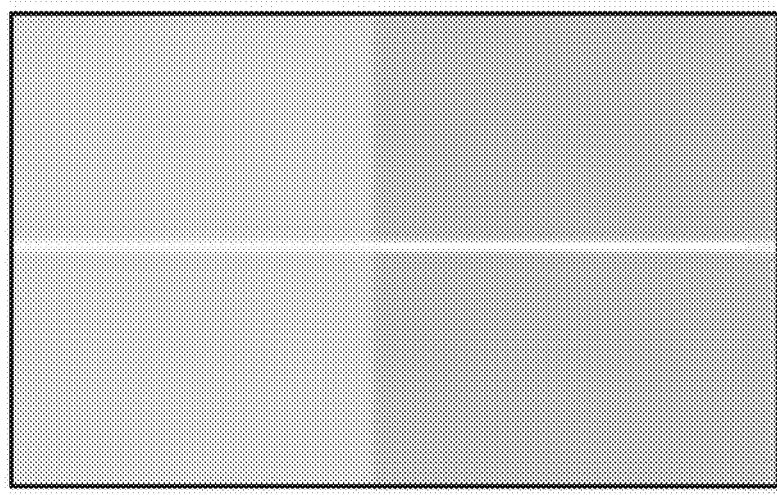
FIG. 2B is a print showing the effect on an image of redistributing duty to nozzles that neighbor a failed nozzle according to the invention.
Figure 2A:
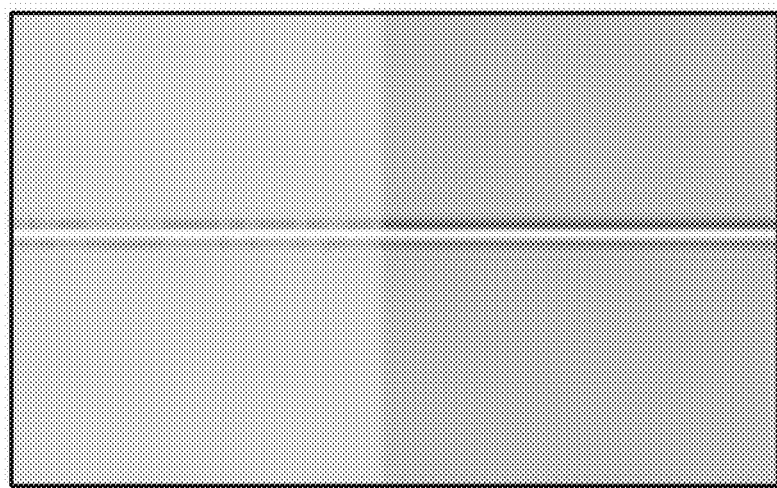
FIG. 2A is a print showing the effect of a failed nozzle on an image.

FIG. 2A is a print showing the effect of a failed nozzle on an image. In FIG. 2A, a white line appears down the center of the image, which results from the failure of a nozzle to print at that point in the image.

FIG. 2B is a print showing the effect on an image of redistributing duty to nozzles that neighbor a failed nozzle according to the invention. As can be seen in FIG. 2B, while the white line that results from the failed nozzle is still present in the print, the lines on either side of this area are much darker. At sufficient cross-process resolution, e.g. 600 dpi, the darker lines on either side of the white line create an optical illusion when the print is viewed, such that the white line that results from the failed nozzle is not readily visible.

Figure 3:
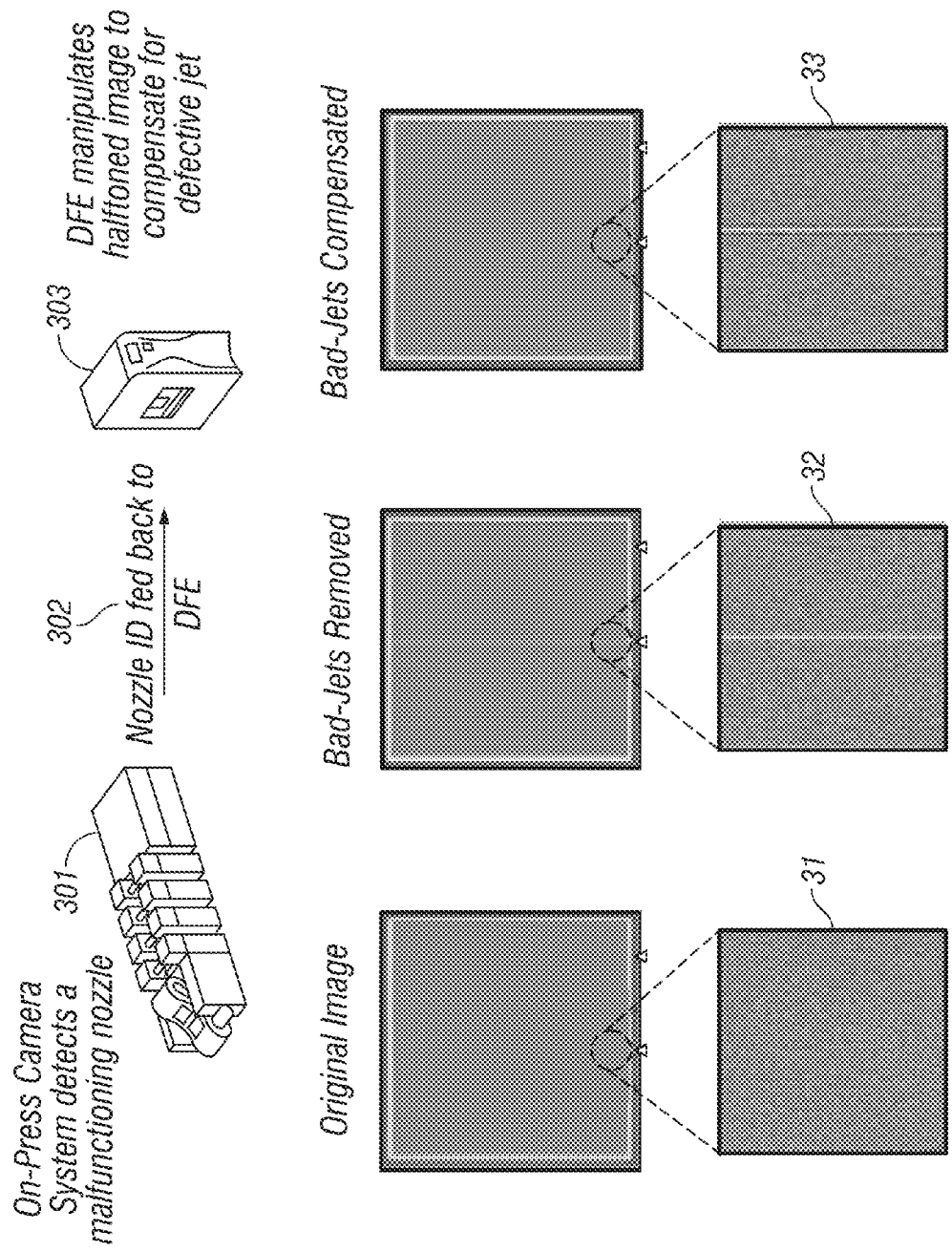
FIG. 3 is a flow diagram showing the redistribution of duty to nozzles that neighbor a failed nozzle and the effect thereof on an image according to the invention.

FIG. 3 is a flow diagram showing the redistributing of duty to nozzles that neighbor a failed nozzle and the effect thereof on an image according to the invention.

In the embodiment of the invention shown in FIG. 3, an on-press camera system detects a malfunctioning nozzle (301). For example, when the original image is viewed, as shown by the magnified portion of the image 31, the image does not exhibit an print errors that are attributable to a failed nozzle. However, when a failed nozzle is detected, the nozzle ID is fed back to the Digital Front End (DFE) (302) and the bad nozzles are removed from the image to be printed. This can be seen in the magnified portion 32 of the image, where a line appears down the middle of the image. The DFE then manipulates the halftoned image (303), using the techniques described above, to compensate for the defective nozzle. This can be seen in the magnified portion 33 of the image, where darkened lines appear down the middle of the image on either side of the portion of the image where the failed nozzle would have otherwise deposited ink if it had not failed.

Chromatic Approach to Single Pass Failed Nozzle Compensation

In embodiments of the invention, a chromatic approach may be implemented to reduce the visual impact of a single or small number of multiple, adjacent failed nozzles. Pre-compensations, or adjustments can be applied to the color, contone (multi-gray level) image that is to be printed. These pre-compensations are calculated using the color ICC profile that was used to prepare the contone pixels for printing originally to minimize the visual artifact of the failing nozzle.

In the case where the failing nozzle is the black component, the artifact can typically be hidden by the addition of appropriate levels of the primaries (C, M, Y). The appropriate amount is determine by looking into the ICC printer profile to find lowest color difference "Delta E" which can be created from using only (C, M, Y) to replace that of the original (C, M, Y, K).

Figure 4:
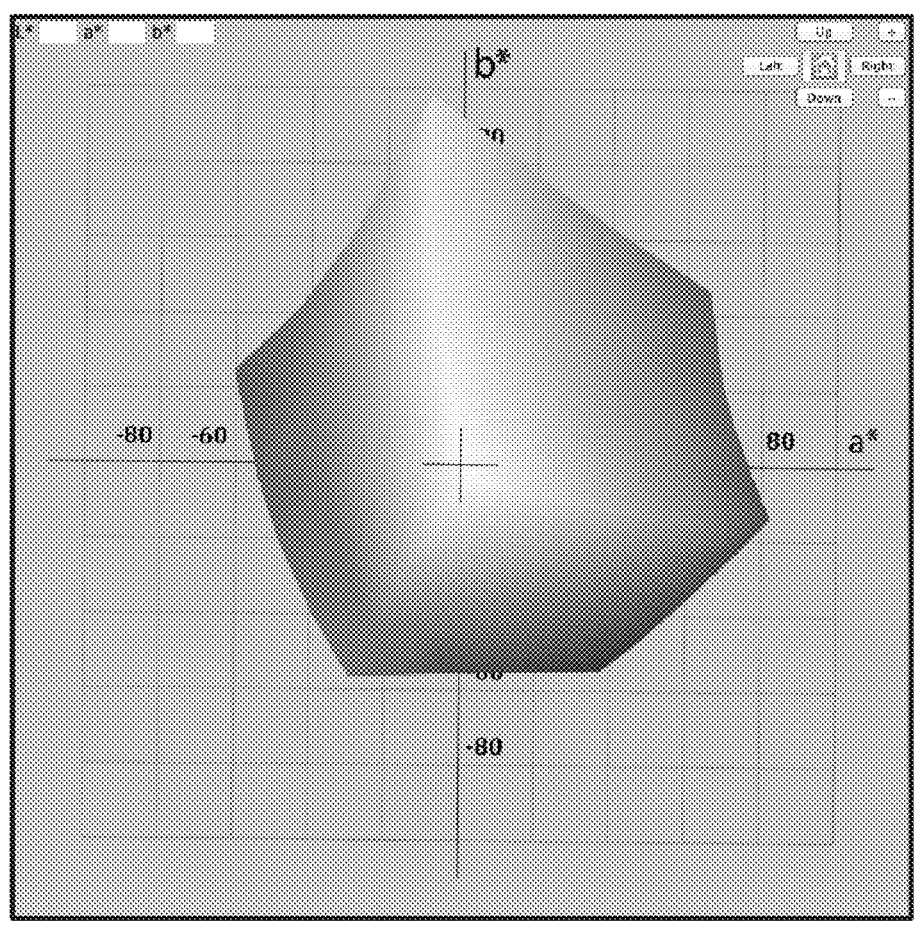
FIG. 4 is a representation of a printer's gamut from the top down, where yellow is the colorant whose nozzle has failed.
Figure 5:
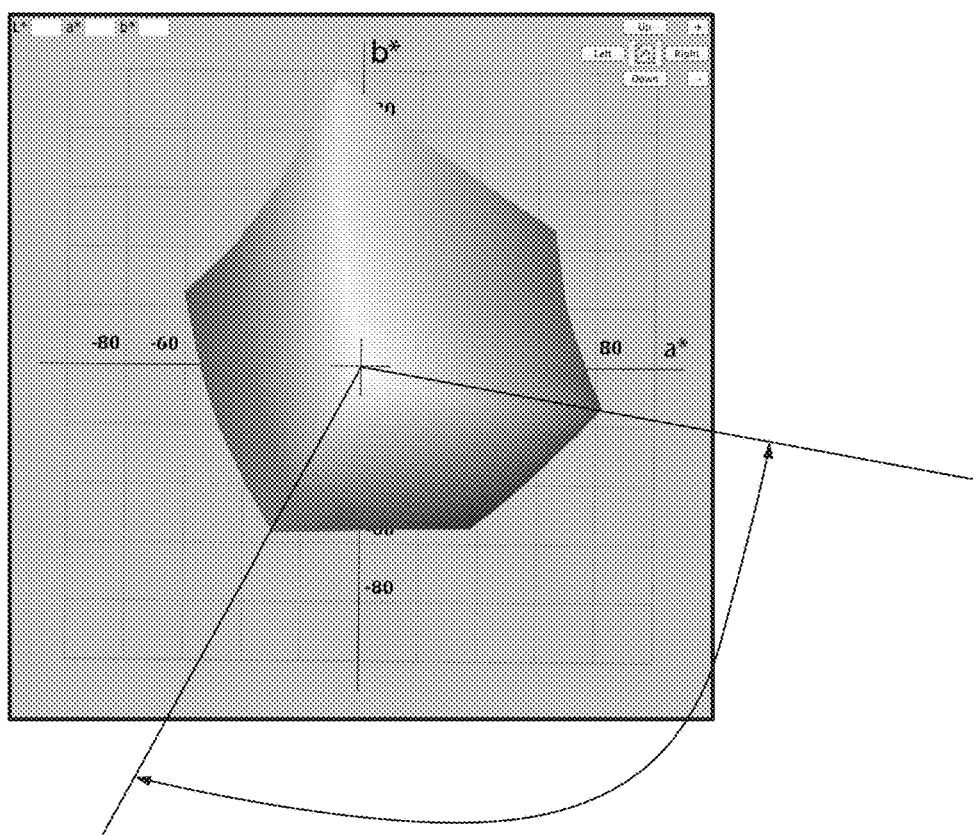
FIG. 5 is a representation of a printer's gamut from the top down, where yellow is the colorant whose nozzle has failed according to FIG. 4, showing that only the hue range within the section identified in "Valid Region" can be printed.

In the case where the failed nozzle is one of the three primary colorants (C, M, Y), it is impossible to represent the exact color on the exact pixel on which the failed nozzle was intended to apply color. This can be seen in FIG. 4, which looks at the printer's gamut from the top down. In the case that yellow is the colorant whose nozzle has failed, only the hue range within the section identified in "Valid Region" can be printed (see FIG. 5).

However, it is possible to minimize the luminance difference on the offending pixel. This is done by referring to the ICC profile currently being used for printing and searching for the value which has the minimum "Delta E" change from the desired color and whose luminance is identical to the desired output color by using the remaining possible inks, in this example C, M and K.

Figure 6:
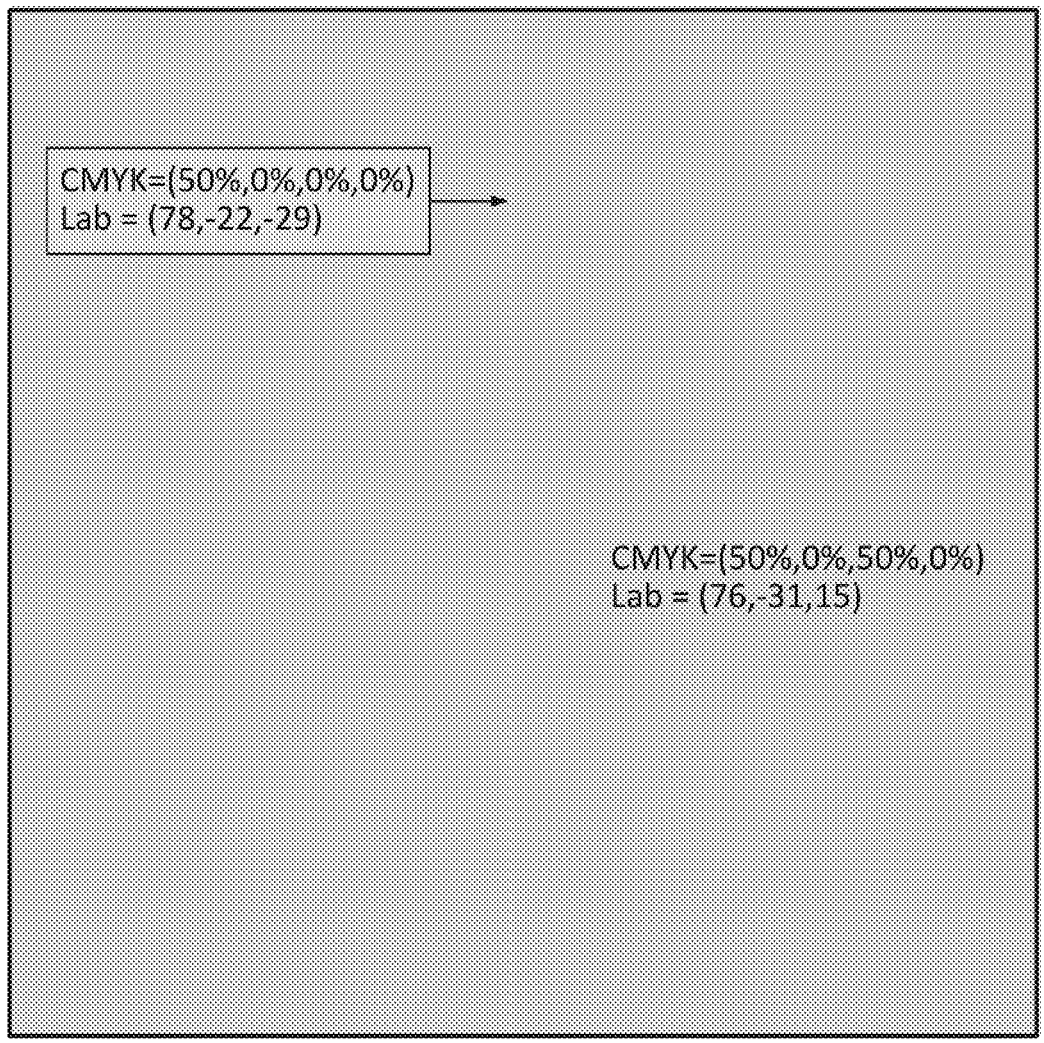
FIG. 6 shows an image that is filled with a constant value of 50% Cyan and 50% Yellow.

To illustrate, FIG. 6 shows an image that is filled with a constant value of 50% Cyan and 50% Yellow. For a selected output profile, this color has a representation of Lab=(76, −31, 15). In the center of this image, a single pixel vertical strip is shown where the Yellow has been set to 0% simulating a single nozzle failure of yellow at this location.

Figure 7:
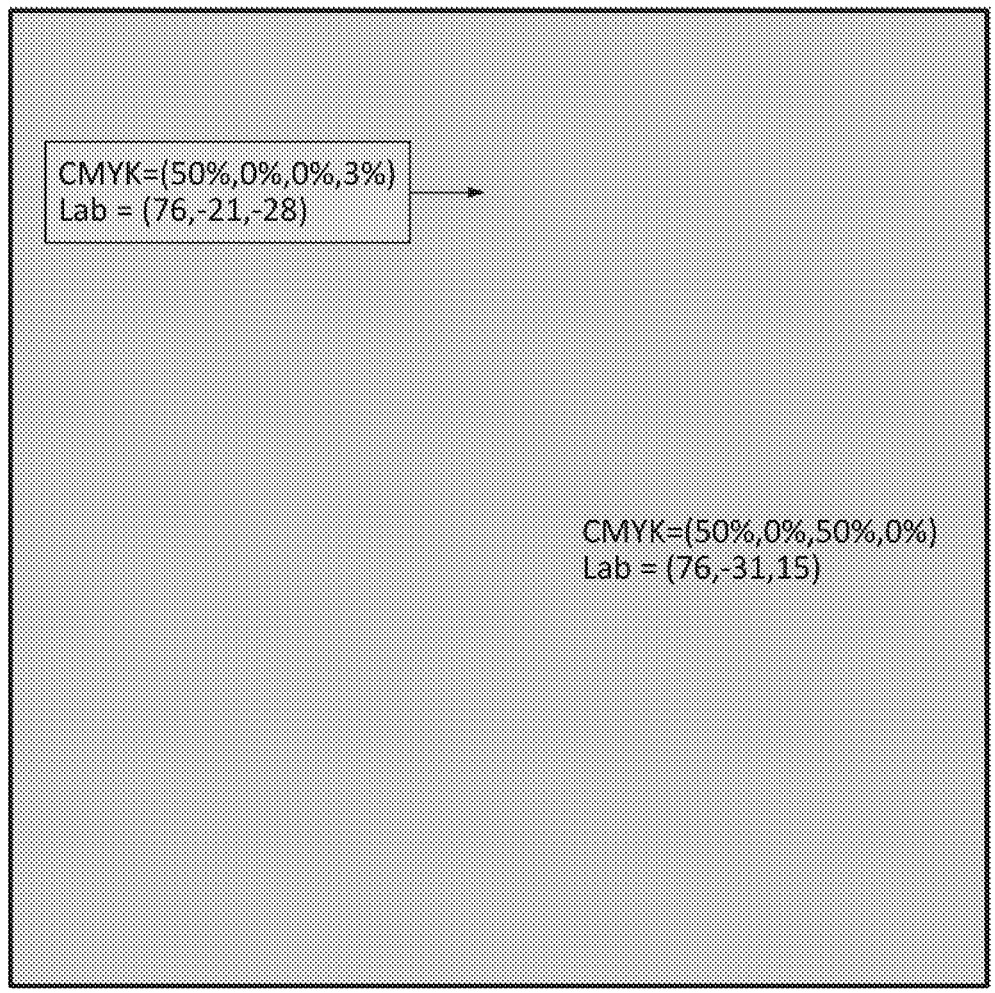
FIG. 7 shows reduction of the visibility of a simulated nozzle failure by the addition of black of 3% to lower this pixel columns luminance level according to the invention.

To reduce the visibility of this simulated nozzle failure, additional black of 3% is added to bring this pixel columns luminance level back to 76, as shown in FIG. 7. The addition of this small amount of black helps to reduce the visual artifact by minimizing the luminance change associated with the nozzle out defect.

Figure 8:
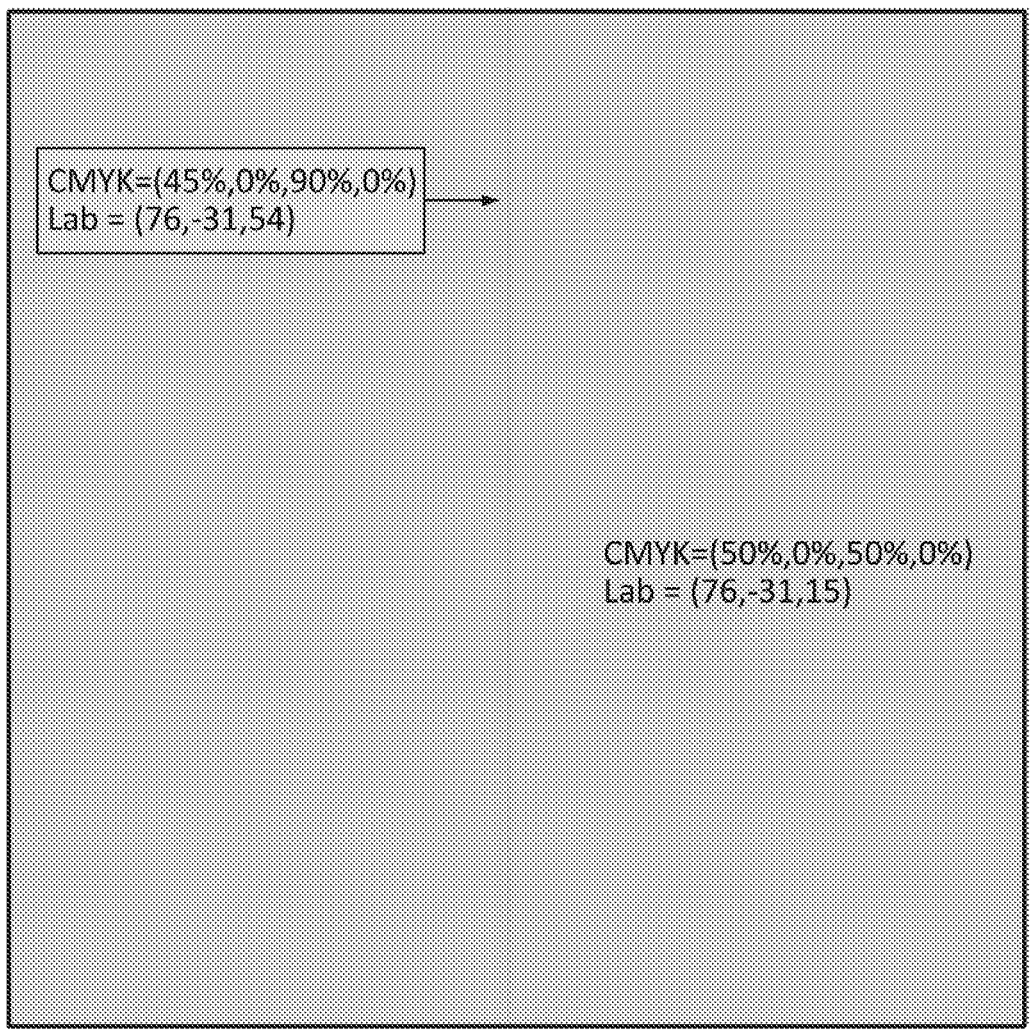
FIG. 8 shows the addition of 40% yellow to the surrounding pixels in an image according to the invention.

As an additional compensation, adding additional amounts of the missing ink to make the average hue and saturation (a* and b*) of the region as if the nozzle were working can compensate the pixels surrounding the nozzle out artifact. In FIG. 8, the addition of 40% yellow to the surrounding pixels is shown. Additionally the amount of cyan was reduced to maintain a constant luminance. This value can be determined from the printer's ICC profile to maintain the pixel's luminance and chrominance value to minimize the average error over a desired region. Depending on the resolution of the printer, this region can be 3×3, 5×5, 7×7, square, diamond, or other standard convolution filtering techniques. The compensation ink region can be limited to pixels adjacent to the failing nozzle, covering multiple pixels adjacent to the failing nozzles or a periodic or random placement adjacent to the region of the failing nozzles.

This technique of reducing the visual luminance and chrominance error of pixel corresponding to the failing nozzle can be extended to printing in more than four colors (C, M, Y, K). In the case of HiFi color printers using 5, 6, 7 or more inks of different colors, for example (C, M, Y, K Orange, Green, Blue), the procedure is similar. First, minimize the luminance error of the pixels under the failing nozzle(s). Second, reduce the average chromatic error of the region by adding additional inks on either side of the failing nozzle(s).

Figure 9:
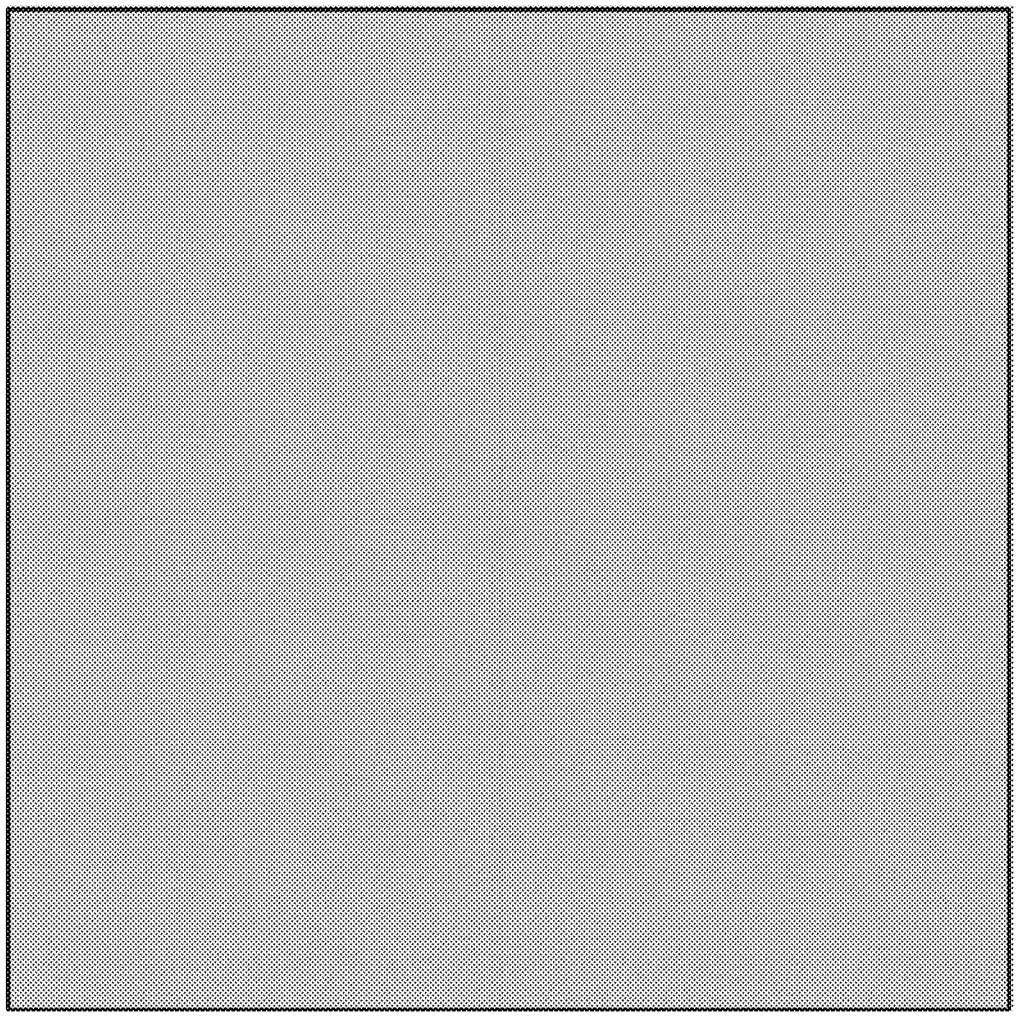
FIG. 9 shows 1% monochromatic Gaussian noise to the image according to the invention.

An additional technique to mask the missing nozzle, in addition to the chromatic approach above, is to add noise to the pixels surrounding the nozzle out. FIG. 9 shows 1% monochromatic Gaussian noise to the image. This noise can be blended, for example ramping up from 0% to 1% as the nozzle out artifact is approached and ramping down to 0% again once the artifact is passed to minimize overall image quality degradation.

As an alternative to adding noise, the physical placement of the nozzle head to media can be modulated. By applying a slight, e.g. one pixel or less, noise in placement to the entire array of heads, the vertical line exhibited by a single nozzle can be mitigated. The artifact which was a line before the placement noise was applied is now jagged and thus less visible to the casual observer.

Computer Implementation

Figure 10:
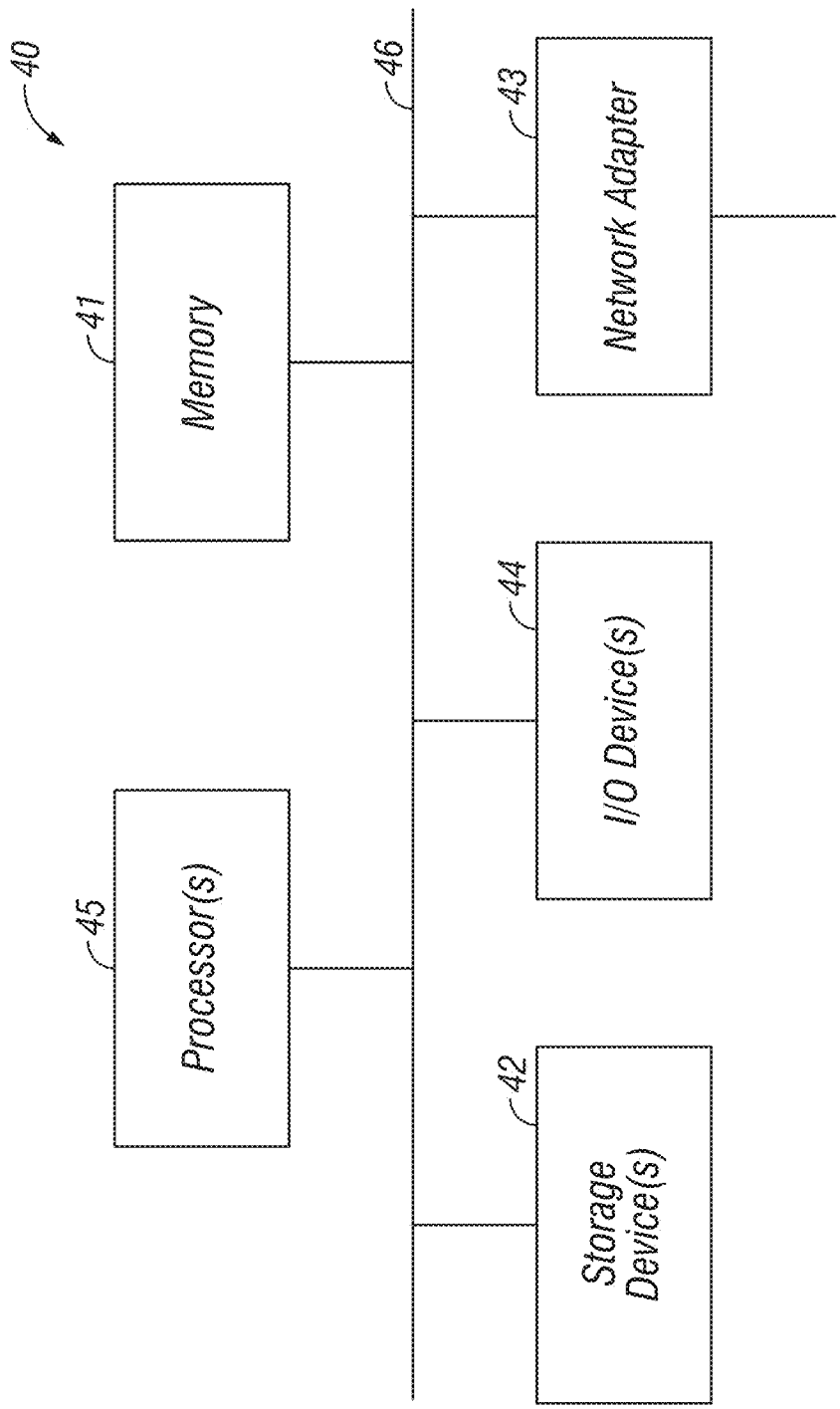
FIG. 10 is a diagrammatic representation of a machine in the example form of a computer system within which a set of instructions for causing the machine to perform one or more of the methodologies discussed herein may be executed.

FIG. 10 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 10, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for single-pass failed, malfunctioning, or underperforming nozzle compensation in a multicolor, single pass printing system, comprising:
   detecting at least one failed, malfunctioning, or underperforming nozzle in said multi-color, single-pass printing system;
   substantially shutting-off said detected nozzle; and
   with a processor,
      determining a pixel that was to be printed by said failed, malfunctioning, or underperforming nozzle ("pixel");
      determining the luminance and chrominance of the pixel;
      searching in a color profile for values that have a luminance value identical to the luminance of the pixel;
      among the values that have the luminance value identical to the luminance of the pixel, finding the value which has a minimal chrominance difference from the pixel;
      using this value to print at the location of the pixel;
      identifying proximate pixels at at least two pixel locations that are proximate to the pixel;
      identifying nozzles for different color inks that print the proximate pixels; and
      chromatically redistributing image data that was intended to be printed by said failed, malfunctioning, or underperforming nozzle to said identified nozzles for different color inks at said at least two pixel locations.

2. The method of claim 1,
   wherein said color profile is an ICC profile currently being used for printing.

3. The method of claim 2, further comprising:
   reducing visibility of the failed, malfunctioning, or underperforming nozzle by adding a selected amount of black ink when printing the pixel that was to be printed by said failed, malfunctioning, or underperforming nozzle to reduce a visual artifact by minimizing a luminance and/or chrominance change associated with the failed, malfunctioning, or underperforming nozzle.

4. The method of claim 1, further comprising:
   adding noise to pixels surrounding a missing pixel to be printed by the failed, malfunctioning, or underperforming nozzle.

5. The method of claim 4, further comprising:
   minimizing overall image quality degradation by blending said noise by ramping up as the missing pixel is approached and ramping down once the missing pixel is passed.

6. The method of claim 1, further comprising:
   modulating physical placement of the nozzle head by applying a one pixel or less of noise in placement to an entire array of print heads.

7. The method of claim 1, further comprising:
   stochastically distributing image data to each of said pixels to be printed by nozzles of different color inks.

8. The method of claim 1, further comprising:
   where the failed, malfunctioning, or underperforming nozzle is the black component, adding appropriate levels of primary color (C, M, Y) as determined with reference to an ICC printer profile to find a lowest "Delta E" difference which can be created from using only (C, M, Y) to replace that of the original (C, M, Y, K).

9. The method of claim 1, further comprising:
   reducing visual luminance and chrominance error of a pixel corresponding to said failed, malfunctioning, or underperforming nozzle when printing in more than four colors (C, M, Y, K) by first minimizing a luminance error of the pixels under the failed, malfunctioning, or underperforming nozzle, and then reducing an average chromatic error of a region by adding additional inks on either side of the failed, malfunctioning, or underperforming nozzle.

10. A computer implemented method for single-pass failed, malfunctioning, or underperforming nozzle compensation in a multicolor, single pass printing system, comprising:
    detecting at least one failed, malfunctioning, or underperforming nozzle in said multi-color, single-pass printing system;
    substantially shutting-off said detected nozzle;

with a processor,
identifying replacement pixels at at least two pixel locations that are identical or proximate to the pixel of location of said failed nozzle and that minimize any of a luminance and chrominance difference between said replacement pixels and the luminance or chrominance exhibited by the pixel that was to be printed by said failed, malfunctioning, or underperforming nozzle;
identifying nozzles for different color inks that print the replacement pixels; and
chromatically redistributing image data that was intended to be printed by said failed, malfunctioning, or underperforming nozzle to said identified nozzles for different color inks at said at least two pixel locations, said minimizing further comprising:
referring to an ICC profile currently being used for printing; and
identifying a value which has the minimum "Delta E" change from a desired color and whose luminance and/or chrominance is identical to a desired output color for the pixel that was to be printed by said failed, malfunctioning, or underperforming nozzle by using any of the remaining possible inks to print said pixel; and
adding additional amounts of a missing ink to the image to compensate in pixels surrounding the missing pixel to be printed by the failed, malfunctioning, or underperforming nozzle to make the average hue and saturation (a* and b*) of a region proximate to the missing pixel appear as if the failed, malfunctioning, or underperforming nozzle were working.

11. The method of claim 10, further comprising:
determining a value from an ICC profile currently being used for printing to maintain a pixel luminance value to minimize an average error over a desired region.

12. The method of claim 11, wherein said region comprises any of 3×3, 5×5, 7×7, square, diamond, or other standard convolution filtering techniques.

* * * * *